United States Patent
Ishikawa et al.

(10) Patent No.: US 7,068,485 B2
(45) Date of Patent: Jun. 27, 2006

(54) MULTI-OUTPUT ELECTRIC POWER SOURCE DEVICE AND VEHICLE-MOUNTED ELECTRONIC CONTROL DEVICE

(75) Inventors: Takanori Ishikawa, Chita-gun (JP); Toru Itabashi, Anjo (JP); Yukihide Niimi, Chita-gun (JP)

(73) Assignee: Denso Corpopration, Kariya (JP)

( * ) Notice: Subject to any disclaimer, the term of this patent is extended or adjusted under 35 U.S.C. 154(b) by 268 days.

(21) Appl. No.: 10/670,458

(22) Filed: Sep. 26, 2003

(65) Prior Publication Data
US 2004/0080886 A1 Apr. 29, 2004

(30) Foreign Application Priority Data
Oct. 24, 2002 (JP) .............................. 2002-310333

(51) Int. Cl.
*H02H 9/08* (2006.01)
(52) U.S. Cl. .................. 361/93.9; 361/18; 361/100
(58) Field of Classification Search ................ 361/18, 361/93.9, 100
See application file for complete search history.

(56) References Cited

U.S. PATENT DOCUMENTS

| 4,034,232 A | * | 7/1977 | LaVenture ............... 307/32 |
|---|---|---|---|
| 4,428,016 A | * | 1/1984 | Brasfield ............... 361/18 |
| 5,691,870 A | * | 11/1997 | Gebara ................ 361/86 |
| 6,424,128 B1 | | 7/2002 | Hiraki et al. |

FOREIGN PATENT DOCUMENTS

| JP | A-H06-27158 | 2/1994 |
|---|---|---|
| JP | A-H11-65685 | 3/1999 |
| JP | A-H11-206039 | 7/1999 |
| JP | A-2002-267696 | 9/2002 |

* cited by examiner

Primary Examiner—Phuong T. Vu
Assistant Examiner—Dharti H. Patel
(74) Attorney, Agent, or Firm—Posz Law Group, PLC

(57) ABSTRACT

A multi-output electric power source device has at least two channels for producing a constant voltage and a constant voltage from a single input voltage. Each channel is provided with a switching regulator in the input stages thereof and a series regulator in the next stage thereof. An over-heat detector circuit is provided in common for both channels. When the over-heating of either one of switching transistors in the channels is detected, the switching regulators turn off both switching transistors thereby to interrupt both output voltages from being supplied to an external circuit. When an over-voltage is detected, series regulators also interrupt the output voltages from being supplied to the external unit.

22 Claims, 7 Drawing Sheets

MULTI-OUTPUT ELECTRIC POWER SOURCE DEVICE AND VEHICLE-MOUNTED ELECTRONIC CONTROL DEVICE

CROSS REFERENCE TO RELATED APPLICATION

This application relates to and incorporates herein by reference Japanese Patent Application No. 2002-310333 filed on Oct. 24, 2002.

FIELD OF THE INVENTION

This invention relates to a multi-output electric power source device which changes an input voltage from an external electric power source into plural kinds of constant voltages and feeds them to external objects to which the electric power is to be supplied.

BACKGROUND OF THE INVENTION

Electronic control devices mounted on vehicles have generally been so constructed that an internal microcomputer and peripheral circuits operate on the same electric power source voltage (for example 5 V).

In recent years, however, accompanying the trend toward higher performance required for microcomputers, internal cores (e.g., CPUs and memories) have now been operated at an electric power source voltage (e.g., 3.3 V) lower than the customarily employed voltage to accomplish a high-speed operation. However, input/output circuits in the microcomputer for exchanging signals with external circuits and peripheral circuits of the microcomputer, still use inexpensive parts that operate on the conventional electric power source voltage.

Therefore, it has been urged to provide an electric power source device capable of providing plural kinds of electric power source voltages to supply the conventional electric power source voltage to the input/output circuits in the microcomputer and to the peripheral circuits, as well as to supply a low electric power source voltage to the cores in the microcomputer.

As an electric power source device of this kind is so constructed as to supply plural kinds of electric power source voltages to an external unit by combining switching regulators and series regulators in a plurality of sets on the integrated circuit (U.S. Pat. No. 6,424,128 B1).

U.S. Pat. No. 6,424,128 B1 proposes an electric power source circuit capable of supplying two kinds of electric power source voltages, having a switching regulator that meets a large current consumption mode in a state where the microcomputer is active and a series regulator that meets a small current consumption mode in a standby state, to supply a low voltage to the microcomputer. The electric power source circuit further has a series regulator for supplying an electric power source voltage to other circuits.

Further, as the functions of a vehicle-mounted electronic control device are becoming sophisticated year after year, not only the microcomputers are consuming increased currents but also the peripheral circuits are consuming increased currents, too. To meet this tendency, therefore, it can be contrived to replace the series regulator in the electric power source circuit that supplies power to other circuits by a switching regulator capable of supplying a large current with a power loss smaller than that of the series regulator, to produce two kinds of electric power source voltages relying upon the switching regulators. One circuit construction is shown in FIG. 7.

FIG. 7 schematically illustrates a multi-output electric power source device 90 capable of producing two kinds of electric power source voltages by using two switching regulators. This multi-output electric power source device 90 includes two switching regulators. That is, a first switching regulator is provided for producing a constant voltage V4 converted (lowered) from an external electric power source voltage V1 that is input through an input smoothing circuit 91 comprising a coil and a capacitor. The first switching regulator comprises a switching MOSFET (MOS1), a first switching control circuit 70 and an output smoothing circuit 77. A second switching regulator is provided for producing a constant voltage V7 converted (lowered) from the external electric power source voltage V1. The second switching regulator comprises a MOS2, a second switching control circuit 80 and an output smoothing circuit 87.

The switching regulators operate in the same manner but produce different output voltages. Therefore, the first switching regulator will be briefly described below. The input voltage V1 from the external electric power source is applied to the MOS1 through the input smoothing circuit 91 and a current detecting resistor R41. The MOS1 is turned on and off by a control signal (voltage pulse signal) from the first switching control circuit 70, and a pulse-like voltage output from the MOS1 is converted into a stabilized average voltage through the output smoothing circuit 77 constructed by a flywheel diode, a coil and a capacitor. The average voltage is supplied as a constant voltage output V4 to a core 61a in a microcomputer 61.

The first switching control circuit 70 is a known one that provides a control signal to the MOS1 based on the feedback of the constant voltage output V4. The output voltage V4 that is fed back is divided and is input to a switching regulator control circuit 71. The switching regulator control circuit 71 provides an error signal based on a difference of a divided voltage value and a reference voltage Vr1 from a reference voltage generating circuit 73. The error signal is compared with a triangular wave from a triangular wave generating circuit 74 to determine an on/off duty ratio of the MOS1.

Unlike the devices for use commercially, the electric power source device for vehicle-mounted electronic control devices must have self-protecting function for maintaining safety against abnormal conditions in the electric power source device (over-voltage, over-current in the electric power source path, over-heating of switching elements, etc.) caused by external factors such as fluctuation in the external electric power source at the receiving end, and short-circuit of the wiring, over-load, etc. on the output side.

Therefore, the device is so constructed as to detect an over-current in the current-carrying path by detecting a current in the current-carrying path of from the input voltage side of the external electric power source to the microcomputer 61 to which the electric power source is to be supplied relying upon the current detecting resistor R41 and a differential amplifier 75, and by inputting the current to the switching regulator control circuit 71, as well as to detect an over-voltage by dividing the input voltage by the voltage-dividing resistors R72, R73 and comparing the divided voltage with a reference potential by using a comparator 76. Further, an over-heat detector circuit 72 for detecting the over-heating of the MOS1.

When any one of over-current, over-voltage or over-heat is detected, the switching regulator control circuit 71 so controls the first switching regulator that no constant voltage output V4 is produced to an external unit. The second switching regulator operates in quite the same manner as to produce the constant voltage output V7 which is fed to an I/O port 61*b* in the microcomputer 61.

With the multi-output electric power source device 90 shown in FIG. 7, however, different voltages can be supplied to the core 61*a* and to the I/O port 61*b* relying upon the two switching regulators. In case any of the above abnormal condition is detected in either one of the switching regulators, however, the output is no longer produced from the defective switching regulator, and the operation of the microcomputer 61 loses operation stability.

In, for example, the first switching regulator, a current of a magnitude (hereinafter referred to as "half-short") that is smaller than a current that can be determined to be overcurrent may continue to flow through the current-carrying path from the input side to the output side, and over-heating may be detected by the over-heat detector circuit 72. In this case, the switching regulator control circuit 71 discontinues the output of constant voltage V4. Then, the core 61*a* ceases to operate while the second switching regulator continues to produce the constant voltage V7, and the I/O port 61*b* continues to operate.

When the I/O port 61*b* continues to operate despite the core 61*a* has ceased to operate, the I/O port 61*b* may produce an unexpected signal to an external unit to cause error in the operation of various electronic loads connected to be controlled by the microcomputer 61.

FIG. 8 illustrates the operations of MOS1 and MOS2 in the multi-output electric power source device 90 of FIG. 7, voltages at various portions and the operation condition of the microcomputer 61. As shown in FIG. 8, when the multi-output electric power source device 90 starts operating (i.e., when the switching regulators start operating), the MOS1 and MOS2 commences the switching operation to produce constant voltages V4 and V7, and the electric power is supplied to the microcomputer 61. If, for example, the output side of the first switching regulator is placed in a half-short state causing the MOS1 to be over-heated and if this is detected by the over-heat detector circuit 72, the MOS1 discontinues the switching operation and the constant voltage output V4 is no longer produced.

Here, the constant voltage output V4 does not readily become zero as shown but gradually decreases due to residual magnetic energy in the coil and the residual electric charge in the capacitor in the output smoothing circuit 77. The core 61*a* in the microcomputer 61 continues to operate even on a low electric power source voltage in a step where the output voltage V4 is decreasing. The MOS2, on the other hand, continues its normal switching operation even when the output voltage V4 decreases down to a region where the normal operation of the core 61*a* cannot be guaranteed, and the electric power continues to be supplied to the I/O port 61*b*. It is, therefore, probable that the I/O port 61*b* produces an unexpected control signal to control the external electronic loads even temporarily in a state where the output voltage V4 is decreasing.

Not only in the step where the output voltage V4 to the core 61*a* drops but even after the output voltage V4 has become completely zero and the core 61*a* no longer operates, it is probable that the I/O port 61*b* may still produce an unexpected control signal.

Conversely, though not illustrated, in case an abnormal condition in the second switching regulator is detected, the constant voltage output V7 is no longer output to the I/O port 61*b*. In this case, too, the power supply continues to flow to the core 61*a* despite the I/O port 61*b* is no longer operating, and the electric power is wastefully consumed.

In addition to the above problem of protection function, the multi-output electric power source device 90 of FIG. 7 still has a problem in that since switching regulator circuits are simply connected in parallel to constitute a switching regulator of two systems, the circuit itself must be constructed in a very large scale for controlling the electric power source as compared to the construction in which the switching regulator and the series regulator are connected in parallel. Besides,the electric power source device for the vehicle-mounted electronic control devices must be furnished with a circuit of self-protection function which is indispensable for maintaining safety. Accordingly, the circuit scale increases and the cost increases, too.

SUMMARY OF THE INVENTION

The present invention therefore has a first object of realizing a protection operation that works harmoniously among a plurality of constant voltage generating circuits in a multi-output electric power source device which is so constructed that an input from an external electric power source is changed to predetermined supply voltages by a plurality of constant voltage generating circuits having switching regulators.

The present invention also has a second object of decreasing the cost of the device by sharing the circuit construction for controlling the supply voltages among the plurality of constant voltage generating circuits.

According to the first aspect of the invention, a multi-output electric power source device is so constructed that an input from an external electric power source is changed to predetermined supply voltages by a plurality of constant voltage generating circuits so as to be supplied to a vehicle-mounted electronic control device. At least two constant voltage generating circuits have switching regulators for changing the input from the external electric power source.

Among the constant voltage generating circuits equipped with switching regulators, at least two of them are the constant voltage generating circuits to be protected, and an abnormal condition detector circuit comprising one circuit used in common for the constant voltage generating circuits to be protected, detects the occurrence of an abnormal condition that may occur in either one of the constant voltage generating circuits to be protected. When the abnormal condition is detected by the abnormal condition detector circuit, a protection circuit provided for all of the constant voltage generating circuits to be protected, interrupts or limits the output of supply voltage from the corresponding constant voltage generating circuits to be protected.

That is, each constant voltage generating circuit to be protected has a switching regulator in at least the input stage thereof, and the input from the external electric power source is changed by the switching regulator. The lowered voltage may be directly output as a supply voltage, or may be further changed and output as a supply voltage like the multi-output electric power source device.

The abnormal condition detector circuit is not provided for each of the constant voltage generating circuits to be protected, but is used in common by all constant voltage generating circuits to be protected. Therefore, in case an abnormal condition occurs in any one of the constant voltage generating circuits to be protected, this abnormal condition is detected by the abnormal condition detector circuit. In response to this, all constant voltage generating circuits to be protected interrupt or limit the output of supply voltages relying upon the protection means formed therein.

According to the multi-output electric power source device of the present invention, therefore, one abnormal condition detector circuit is used in common by all constant voltage generating circuits to be protected, so that the internal construction of the device is simplified. In case an abnormal condition occurs in any one of the constant voltage generating circuits to be protected, the constant voltage generating circuits to be protected are all protected (output of supply voltage is interrupted or limited). In case an abnormal condition occurs, therefore, the protection is provided in the device as a whole and, besides, the cost of the device as a whole is lowered.

According to the second aspect of the invention, a multi-output electric power source device is so constructed that an input from an external electric power source is changed to predetermined supply voltages by a plurality of constant voltage generating circuits having the switching regulator so as to be supplied to a vehicle-mounted electronic control device. Among a plurality of constant voltage generating circuits, at least two of them are the common constant reference voltage generating circuits. The switching regulator provided in the common constant reference voltage generating circuits includes a transistor formed on a current-carrying path of from the input side of the external electric power source to the supply voltage output side and switching control circuit turns the transistor on/off so that the output voltage of the switching regulator becomes a preset target voltage.

The switching control circuit in the switching regulator constituting the common constant reference voltage generating circuit, attenuates its own output voltage that is fed back down to a voltage of a predetermined level, compares an attenuated voltage with a predetermined reference voltage to produce an error signal corresponding to a difference between the two, and for compares the error signal with a predetermined reference waveform to form a duty signal for turning the transistor on/off based upon the compared result.

An attenuation circuit in the switching regulators constituting the common constant reference voltage generating circuits have such output voltage attenuation ratios that the attenuated voltages of when the target voltages of the corresponding switching regulators are fed back assume the same value among all common constant reference voltage generating circuits. Further, one reference voltage generating circuit that provides a reference voltage is used in common by the switching regulators of all common constant reference voltage generating circuits, and a reference waveform generating circuit that provides one reference waveform is used in common by the switching regulators of all common constant reference voltage generating circuits.

That is, even when the target voltages of the switching regulators in the common constant reference voltage generating circuits are not the same, the attenuation ratios of the attenuation circuit are so set that the attenuated voltages all become the same when the target voltages are output and fed back by the switching regulators. Namely, the reference voltage generating circuit need not be provided in each of the switching regulators at least in all the common constant reference voltage generating circuits, but only one reference voltage generating means needs be provided. Therefore, the reference waveform generating circuit need not be provided for each of the switching regulators, but only one reference wave generating circuit need be provided.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
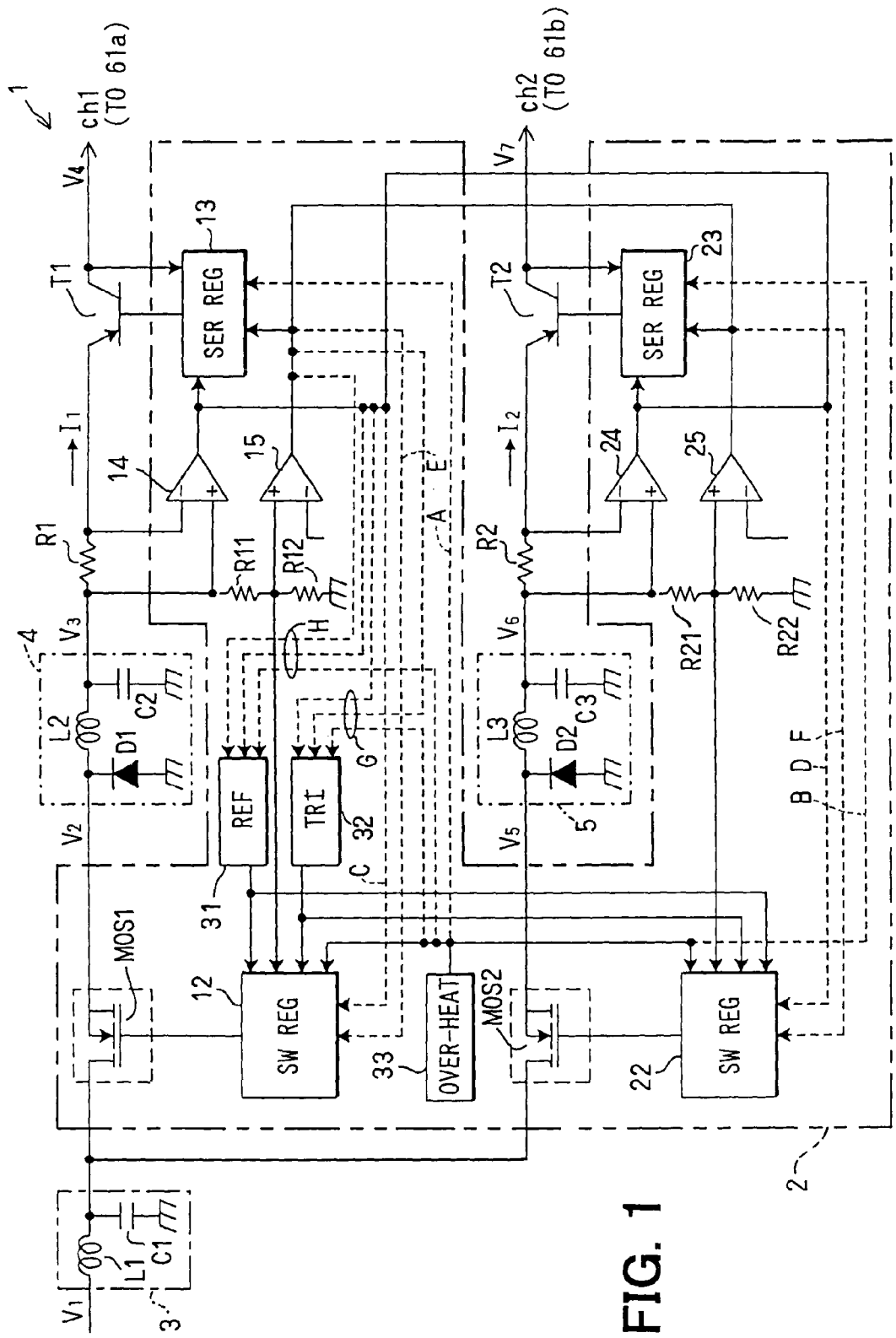
FIG. 1 is a circuit diagram illustrating a multi-output electric power source device according to an embodiment of the invention.
Figure 6:
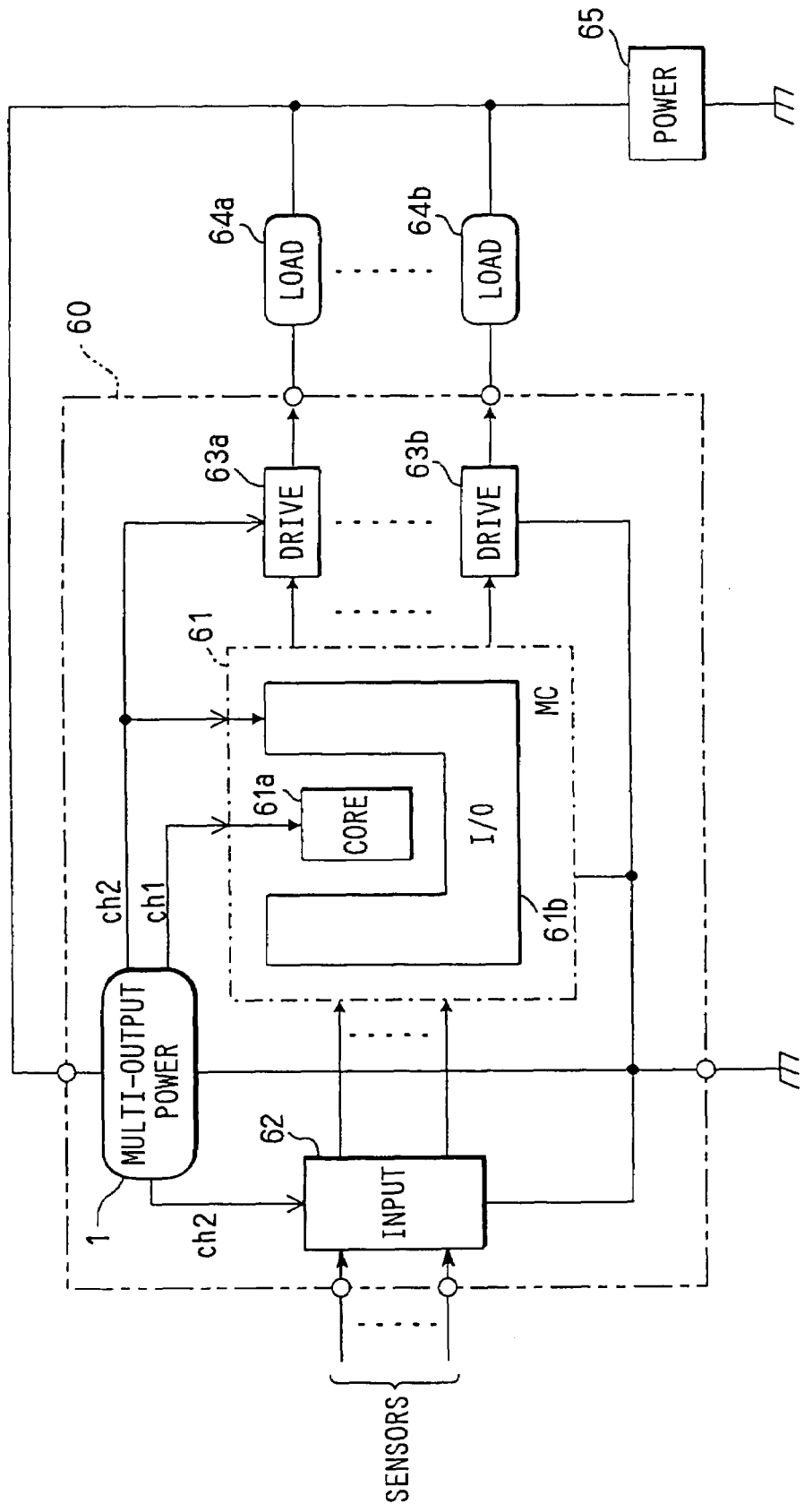
FIG. 6 is a circuit diagram illustrating a vehicle-mounted electronic control device according to the embodiment.
Figure 7:
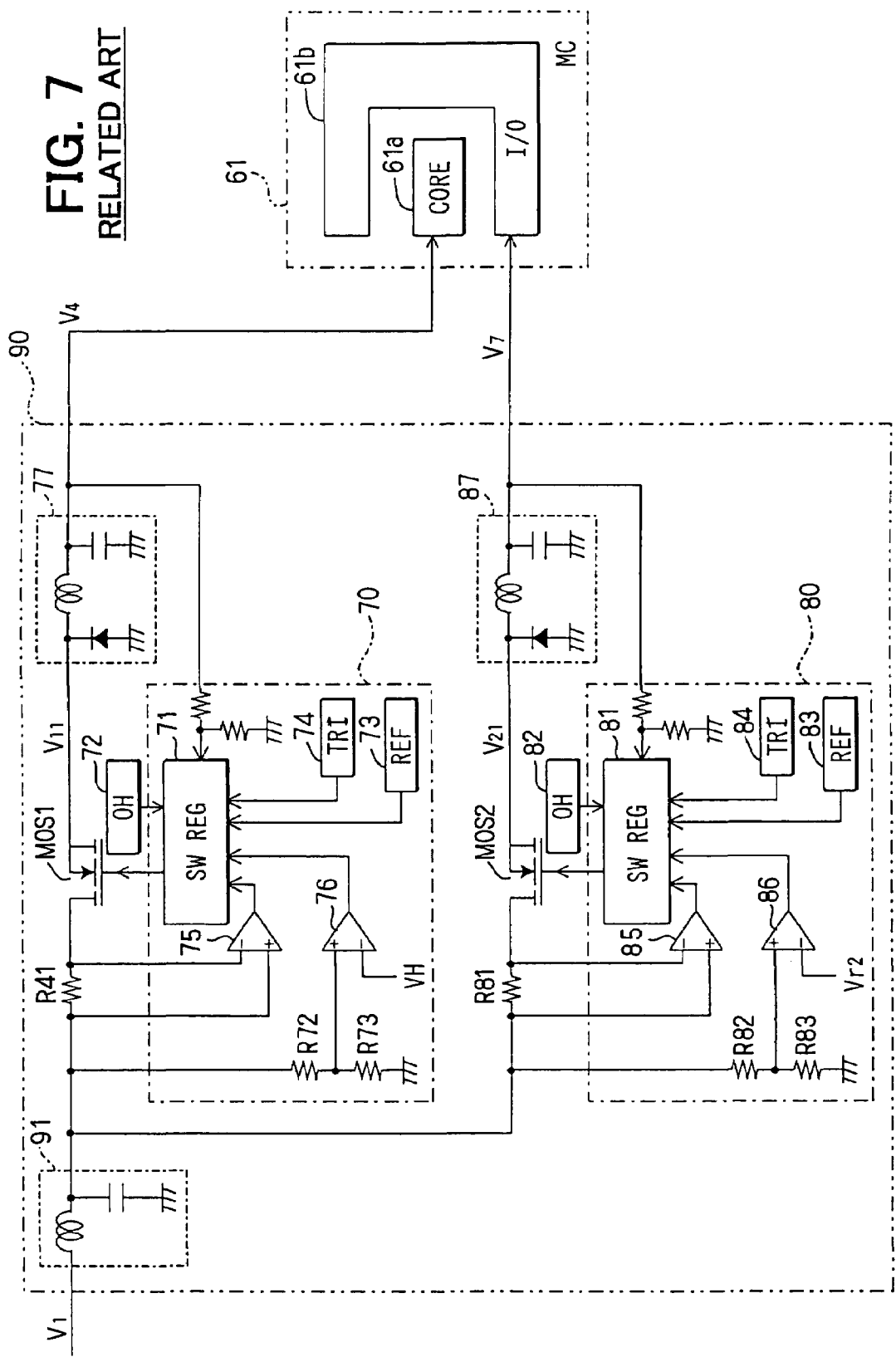
FIG. 7 is a circuit diagram illustrating a multi-output electric power source device capable of forming two kinds of electric power source voltages by using two switching regulators.
Figure 8:
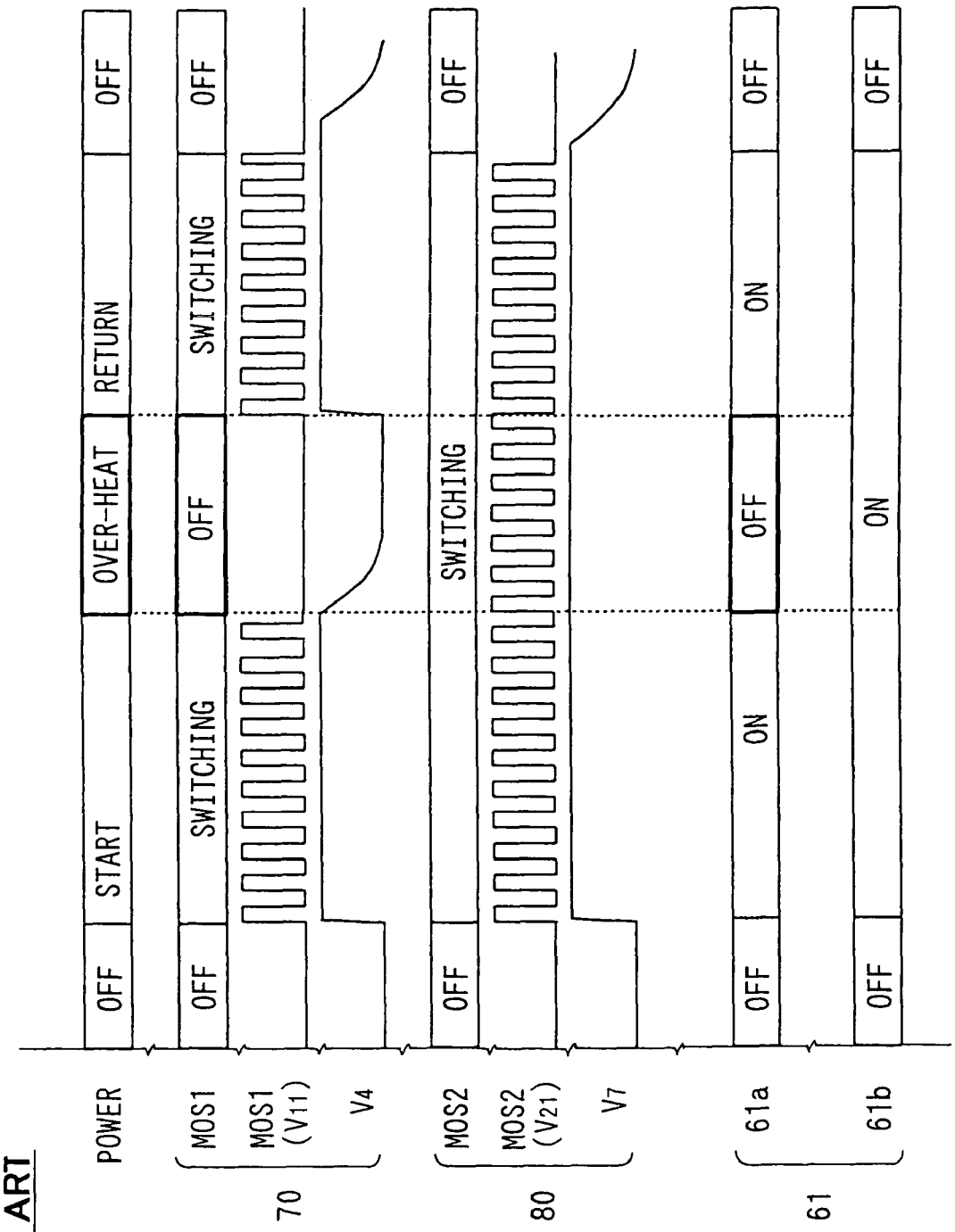
FIG. 8 is an operation diagram illustrating the operation of MOSs in the multi-output electric power source device of FIG. 7, voltages at various portions and the operation of a microcomputer.

Referring to FIG. 1, a multi-output electric power source device 1 is for supplying operation electric power sources to various portions of a vehicle-mounted electronic control device 60 (FIG. 6), and receives an input voltage V1 from an external electric power source such as a battery 65 (FIG. 6) or an alternator (not shown), and provides two kinds of electric power source voltages V4 (ch-1 output) and V7 (ch-2 output). The electric power source voltages V4 and V7 are fed to a microcomputer 61 which is an external supply object and other peripheral circuits which are the objects to be supplied with electric power (FIG. 6).

In the multi-output electric power source device 1, the electric power source voltage V1 from the external electric power source through an input smoothing circuit 3 is lowered to a constant voltage V3 through a first switching regulator which comprises a MOS1, a switching regulator control circuit 12, a reference voltage generating circuit 31, a triangular wave generating circuit 32, an output smoothing circuit 4, a voltage-dividing resistor R11 and a voltage-dividing resistor R12. The voltage V3 is further lowered to a constant voltage output V4 through a first series regulator comprising a transistor T1 and a series regulator control circuit 13, and is fed to an external unit as a ch-1 output voltage.

Similarly, further, the electric power source voltage V1 from the external unit is lowered to a constant voltage V6 through a second switching regulator which comprises a MOS2, a switching regulator control circuit 22, the reference voltage generating circuit 31, the triangular wave generating circuit 32, an output smoothing circuit 5, a voltage-dividing resistor R21 and a voltage-dividing resistor R22. The voltage V6 is further lowered to a constant voltage output V7 through a second series regulator comprising a transistor T2 and a series regulator control circuit 23, and is fed to the external unit as a ch-2 output voltage.

That is, in the multi-output electric power source device 1 of this embodiment, a first constant voltage circuit (ch-1) constructed by the first switching regulator and the first series regulator connected in series, and a second constant voltage circuit (ch-2) constructed by the second switching regulator and the second series regulator connected in series, are connected in parallel to the external electric power source.

A constant voltage generating circuit of the embodiment is constructed by the first constant voltage circuit, a current detecting resistor R1, a differential amplifier 14 and a comparator 15. Similarly, another constant voltage generating circuit of the invention is also constructed by the second constant voltage circuit, a current detecting resistor R2, a differential amplifier 24 and a comparator 25.

Here, the constant voltage circuit of ch-1 for forming the constant voltage output V4 and the constant voltage circuit of ch-2 for forming the constant voltage output V7, produce different output voltages, but their internal circuit construction and operation are the same. Therefore, the constant voltage circuit of ch-1 will be chiefly discussed.

The input voltage V1 from the external electric power source flows through the input smoothing circuit (low pass filter) 3 constructed by a coil L1 and a capacitor C1 so that noise components of frequencies higher than a predetermined frequency are removed. The input voltage V1 is then applied to the MOS1 for switching. The MOS1 is turned on/off by a control signal (voltage pulse signal) from the switching regulator control circuit 12, whereby a pulse-like voltage V2 output from the MOS1 is converted into a stabilized average voltage through the output smoothing circuit 4 constructed by a flywheel diode D1, a coil L2 and a capacitor C2. The average voltage is input to the first series regulator in a succeeding stage as the output voltage V3 of the first switching regulator.

The output voltage V3 is applied to the emitter of the transistor T1 via the current detecting resistor R1. In the first series regulator including the transistor T1, the series regulator control circuit 13 continuously controls the base current of the transistor T1 while feeding back its own output voltage V4, thereby to maintain the output voltage V4 constant.

Figure 2:
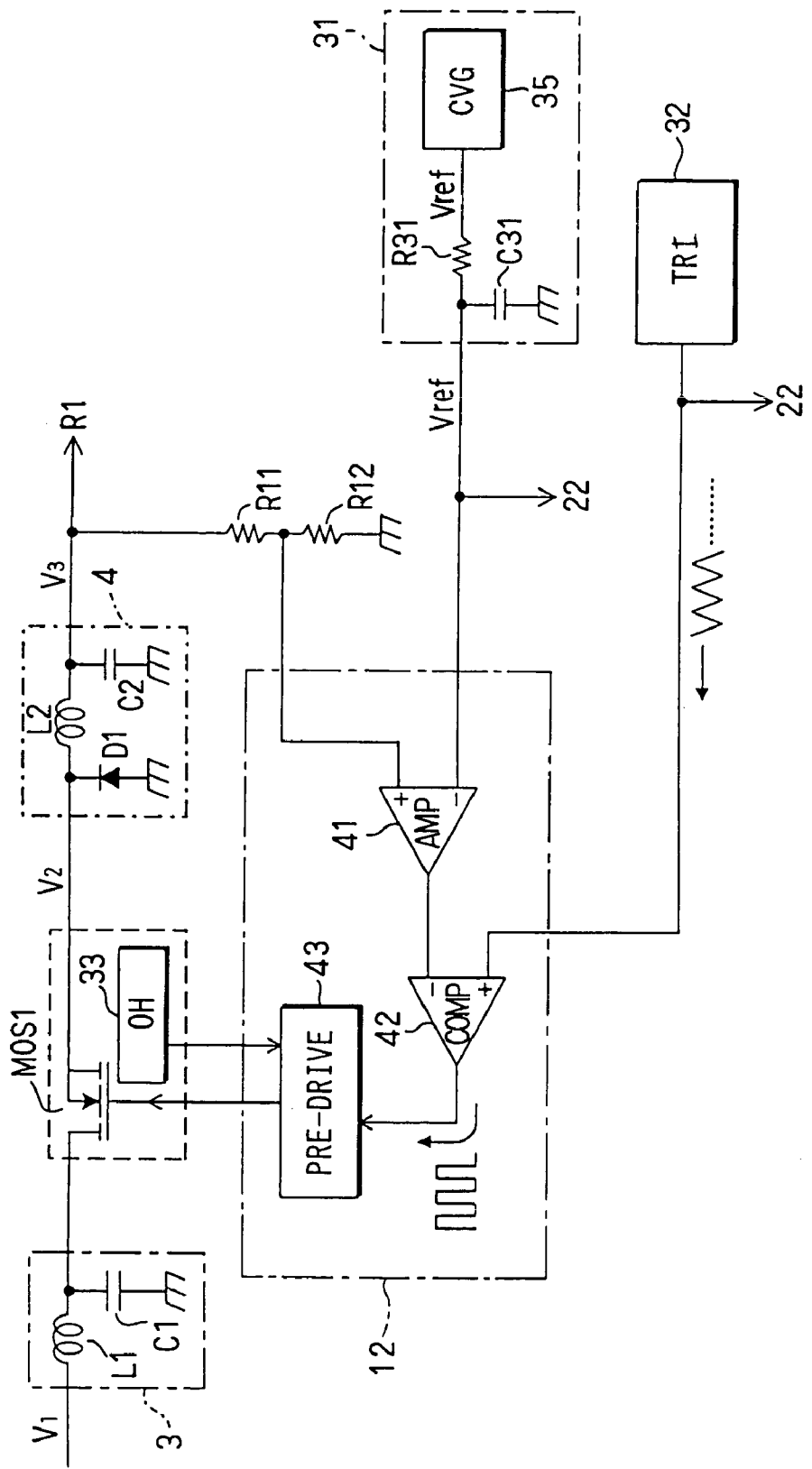
FIG. 2 is a circuit diagram illustrating a switching regulator in the multi-output electric power source device according to the embodiment.

As shown in FIG. 2, the switching regulator (ch-1) has the construction which is the same as, and operates in the same manner as, the known switching regulator. The output voltage V3 that is fed back is divided by the voltage-dividing resistors R11 and R12 (attenuation circuit), and the voltage after divided is applied as an attenuated voltage to the switching regulator control circuit 12.

In the switching regulator control circuit 12, the voltage after divided by the voltage-dividing resistors R11 and R12, and a reference voltage (Vref) formed by the reference voltage generating circuit 31, are input to an error amplifier 41 (error output circuit) which applies an error signal that is dependent on an error between the two to a duty-determining comparator 42.

The duty-determining comparator 42 (duty signal generating circuit) compares the error signal from the error amplifier 41 with a triangular wave (reference waveform) formed by a triangular wave generating circuit 32 (reference waveform generating circuit), and applies a duty signal of a duty ratio that is dependent on the result of comparison to a pre-drive circuit 43. The pre-drive circuit 43 amplifies the duty signal from the duty-determining comparator 42 to a level capable of driving the gate of the MOS1, and applies it as a control signal to the gate of MOS1. The MOS1 is turned on/off by the control signal from the pre-drive circuit 43.

In the multi-output electric power source device 1, the ch-1 output voltage V4 and the ch-2 output voltage V7 assume different values (different target voltages), and the output voltages V3 and V6 from the switching regulators of these channels also assume different values.

In this embodiment, however, the voltage-dividing ratio (attenuation ratio) is so set that when the output voltages V3 and V6 of the switching regulators of these channels assume preset target voltages, the voltage divided by the voltage-dividing resistors R11 and R12 of ch-1 (voltage input to the error amplifier 41 in the switching regulator control circuit 12) becomes equal to the voltage divided by the voltage-dividing resistors R21 and R22 of ch-2 (voltage input to the error amplifier that is not shown in the switching regulator control circuit 22).

In order for the error amplifier to form an error signal by comparison with the divided voltages, the reference voltage input to the switching regulator control circuits 12 and 22 assumes the same value since it is generated by the single reference voltage generating circuit 31. To determine a duty ratio of a control signal output to the MOS1 and MOS2, further, the triangular wave input to the switching regulator control circuits 12 and 22 possess the same waveform since it is generated by the single triangular wave generating circuit 32.

As shown in FIG. 2, further, the reference voltage generating circuit 31 is constructed by a constant voltage generating unit 35 that provides a stable constant voltage Vref and a soft start circuit which includes a resistor R31 and a capacitor C31. That is, the output smoothing circuit 4 and the output smoothing circuit 5 include a capacitor (capacitor C2, C3) for smoothing. It is, therefore, probable that a rush current flows into these capacitors C2 and C3 at the start of operation of the multi-output electric power source device 1 (at the start of operation of the switching regulators). Therefore, the soft start circuit is constructed by the resistor R31 and the capacitor C31. Even when the reference voltage Vref is output from the constant voltage generating unit 35 at the start of operation of the multi-output electric power source device 1, therefore, the capacitor C31 is electrically charged, and the reference voltage input to the switching regulator control circuits 12 and 22 gradually increases from 0 to Vref.

Then, MOS1 and MOS2 gradually increase their duty ratios, and the output voltages V3 and V6 from the switching regulators gradually increase (soft start) up to the target voltages, preventing the rush current at the start of operation of the switching regulators.

The constant voltage Vref may be formed by the constant voltage generating unit 35 when the external electric power source voltage V1 is input through, for example, an ignition switch of a vehicle (not shown) or when the electric power source is received from the battery irrespective of the ignition switch. The reference voltage Vref must have been raised before the MOS1 and MOS2 commence the switching operation. Desirably, therefore, the constant voltage Vref is generated upon receiving the battery electric power source.

Or, in forming the reference voltage Vref upon receipt of input V1 from the external electric power source, the switching operation may not be commenced until the reference voltage is completely raised up to Vref.

Figure 3:
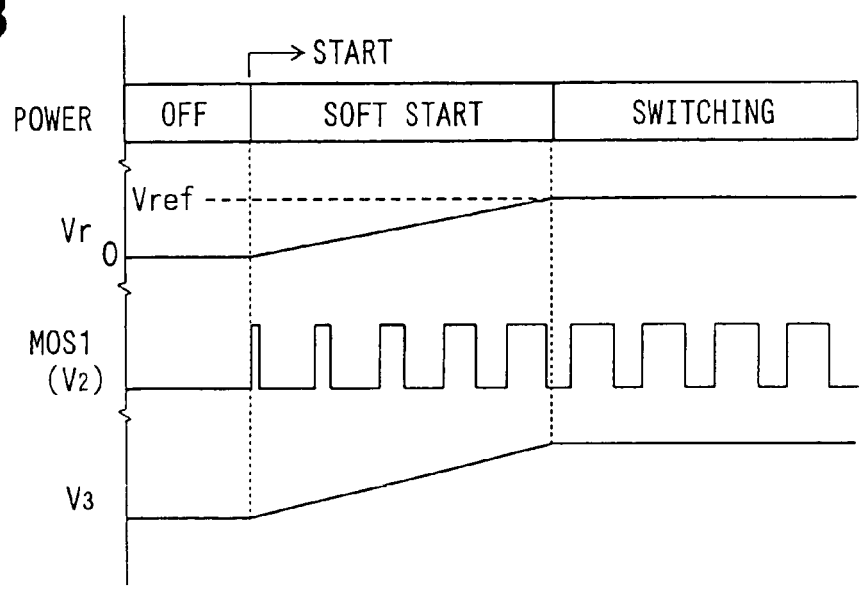
FIG. 3 is an operation diagram illustrating changes in the reference voltage and in the output voltages V2, V3 at the start of the switching operation.

FIG. 3 illustrates changes in the reference voltage Vr and in the output voltages V2 and V3 at the start of the switching regulator operation of ch-1. When the operation of the switching regulator of ch-1 starts, the capacitor C31 for soft start in the reference voltage generating circuit 31 is electrically charged, and the reference voltage Vr input to the switching regulator control circuit 12 does not readily become Vref but gradually increases up to vref. Then, the duty ratio of the output voltage V2 of MOS1, too, gradually increases. As a result, the output voltage V3 after smoothed increases gradually toward the target voltage.

Here, the multi-output electric power source device 1 of this embodiment is provided, in each of the channels, with a circuit for detecting an over-current and an over-voltage in the current-carrying path of from the input side of the external electric power source voltage V1 to the object that is to be supplied with the electric power source, and is further provided with a circuit for detecting the over-heating of the two switching MOS1 and MOS2.

As for the over-current and over-voltage, both channels ch-1 and ch-2 are constructed and operate in quite the same manner. Therefore, the channel ch-1 will be described, first, with reference to FIG. 1. The current detecting resistor R1 is provided on the current-carrying path between the input and the output of the channel ch-1. A potential difference across both terminals of the current detecting resistor R1 is amplified through the differential amplifier 14, and is output to the series regulator control circuit 13 as a signal corresponding to an electric current I1.

The series regulator control circuit 13 detects the level of the electric current I1 from the signal, and determines whether a preset threshold current value is exceeded. When an electric current I1 in excess of the threshold current value is detected, the current is determined to be an over-current. After determined to be the over-current, the series regulator control circuit 13 reduces, for example, the base current of the transistor T1, so that the constant voltage output V4 is not supplied to the external unit.

In this embodiment, further, the series regulator control circuit 23 of the channel ch-2, too, is so constructed as to detect the over-current in the electric current I1 in the channel ch-1 based on a signal from the differential amplifier 14. The output signal from the differential amplifier 14 is applied to the series regulator control circuit 23 of ch-2, too. Therefore, as the electric current I1 of ch-1 increases and exceeds the threshold current value, both the series regulator control circuits 13 and 23 of ch-1 and ch-2 determine it to be an over-current, and constant voltages (V4, V7) are not output from the series regulators.

The same holds also for the channel ch-2. Provision is made of a current detecting resistor R2 and a differential amplifier 24 for detecting an electric current I2 on the current-carrying path between the input and the output thereof and to apply a signal corresponding to the current to the series regulator control circuit 23. The output from the differential amplifier 24 is applied not only to the series regulator control circuit 23 of ch-2 but also to the series regulator control circuit 13 of ch-1.

Therefore, as the electric current I2 of ch-2 increases and exceeds the threshold current value, both the series regulator control circuits 13 and 23 of ch-1 and ch-2 determine it to be an over-current, and constant voltages (V4, V7) are not output from the series regulators.

As for detecting the over-voltage in the channel ch-1, the output voltage V3 of the switching regulator is used for determination. Specifically, a voltage provided by dividing the output voltage V3 by the voltage-dividing resistors R11 and R12 is compared by a comparator 15 with a reference voltage (threshold voltage of the invention) which serves as a reference for determining the over-voltage. When the divided voltage is larger than the reference voltage and high-level signal is output from the comparator 15 to the series regulator control circuit 13, the base current of the transistor T1 is reduced like when an over-current is detected, so that the constant voltage output V4 is not applied to the external unit.

Further, the series regulator control circuit 23 of the channel ch-2, too, is so constructed as to detect the over-voltage in the channel ch-1 based on a signal from the comparator 15. The output signal from the comparator 15 is applied to the series regulator control circuit 23 of ch-2, too. Therefore, as the voltage V3 of ch-1 increases and the output of the comparator 15 assumes a high level, both the series regulator control circuits 13 and 23 of ch-1 and ch-2 cause the series regulators to no longer produce the constant voltages (V4, V7).

That is, when either an over-current or an over-voltage is detected, the operation of the series regulator in the latter stage is limited, so that the constant voltage outputs V4 and V7 will not be applied to the external unit. In this embodiment, further, when either the over-current or the over-voltage is detected in at least ch-1 or ch-2, the operation of the series regulator is limited and the constant voltage outputs V4 and V7 are not produced not only in the channel in which it was detected but also in the other channel.

The voltage-dividing resistors R11 and R12 work to form a feedback voltage to the switching regulator control circuit 12 by dividing the output voltage V3 of the switching regulator in the preceding stage, as well as to divide the output voltage V3 as an object for determining the over-voltage abnormal condition. The same also holds for the channel ch-2.

The reference voltage for determining the over-voltage in each channel may be suitably determined by taking into consideration the target values of output voltages V3 and V6 from the switching regulators and breakdown voltages of the circuit elements. Further, the threshold current value used for detecting the over-current in the series regulator control circuits 13 and 23 in the channels may also be suitably determined by taking into consideration the current values under normal condition and rated currents of the circuit elements.

It is assumed that the MOS1 and MOS2 constituting the switching regulators of the channels generate heat, and the generation of heat is detected to provide a suitable protection. When the half-short state is established due to abnormal consumption of power by the load to where the electric power source is supplied as described above, a large current continues to flow to a degree which is not still reaching the over-current. To provide a protection against the occurrence of the half-short state, therefore, an over-heat detector circuit 33 is provided as an abnormal condition detector circuit as shown in FIG. 1. This detector circuit 33 is located close to both MOS1 and MOS2 so that it may be detect heat generation of the MOS1 and MOS 2.

Figure 5A:
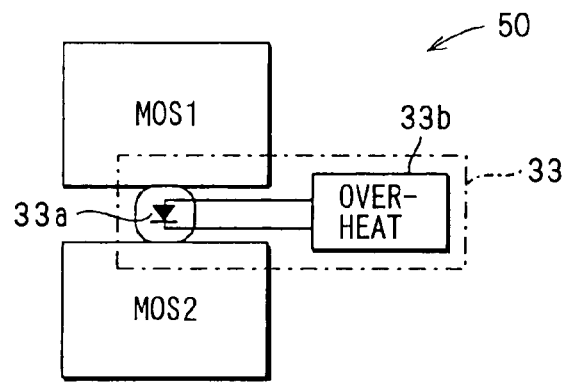
FIG. 5A is a circuit diagram illustrating an over-heat detector circuit and MOSs on an electric power source IC chip.

FIG. 5A illustrates the over-heat detector circuit 33, MOS1 and MOS2. That is, the over-heat detector circuit 33 is constructed by an over-heat detector diode 33a which converts changes in the temperature of MOS1 and MOS2 into electric characteristics, and an over-heat determining circuit 33b for determining which one of MOS1 or MOS2 is over-heated based on the forward voltage of the over-heat detector diode 33a. That is, the over-heat detector circuit 33 utilizes the characteristics in that the forward voltage of the diode increases with a rise in the temperature.

The MOS1 and MOS2 are arranged being close to each other in one electric power source IC chip 50 as shown, and the over-heat detector diode 33a is disposed being sandwiched between MOS1 and MOS2 and neighboring them. With the over-heat detector diode 33a being disposed neighboring MOS1 and MOS2, it is allowed to properly detect changes in the temperature of MOS1 and MOS2.

Figure 5B:
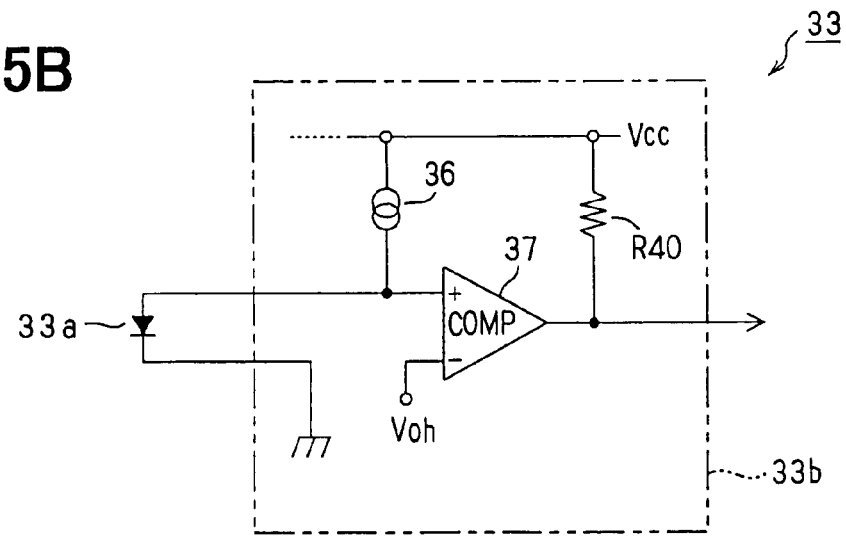
FIG. 5B is a circuit diagram illustrating the over-heat determining circuit in FIG. 5A.

Concretely, the over-heat determining circuit 33b can be realized in a construction shown in, for example, FIG. 5B.

That is, a predetermined bias current is supplied to the over-heat detector diode 33a from the constant-current source 36, and a forward voltage of the over-heat detector diode 33a produced thereby is compared with a reference voltage Voh for determining the over-heat by using the comparator 37. As the temperature of at least one of MOS1 and MOS2 rises, the forward voltage of the over-heat detector diode 33a rises. When the reference voltage Voh for determining the over-heat is exceeded, the output of the comparator 37 assumes the high level.

The switching regulator control circuits 12 and 22 of the channels monitor the output of the comparator 37 at all times, and work to stop the on/off control of the MOS1 and MOS2 when a signal of the high level (i.e., a signal representing the over-heated condition) is input. That is, when either MOS is over-heated, the outputs of ch-1 and ch-2 are both interrupted to provide protection for both channels. The comparator 37 is a comparator with hysteres is whose temperature changing from high to low is lower than a temperature changing from low to high.

Figure 4:
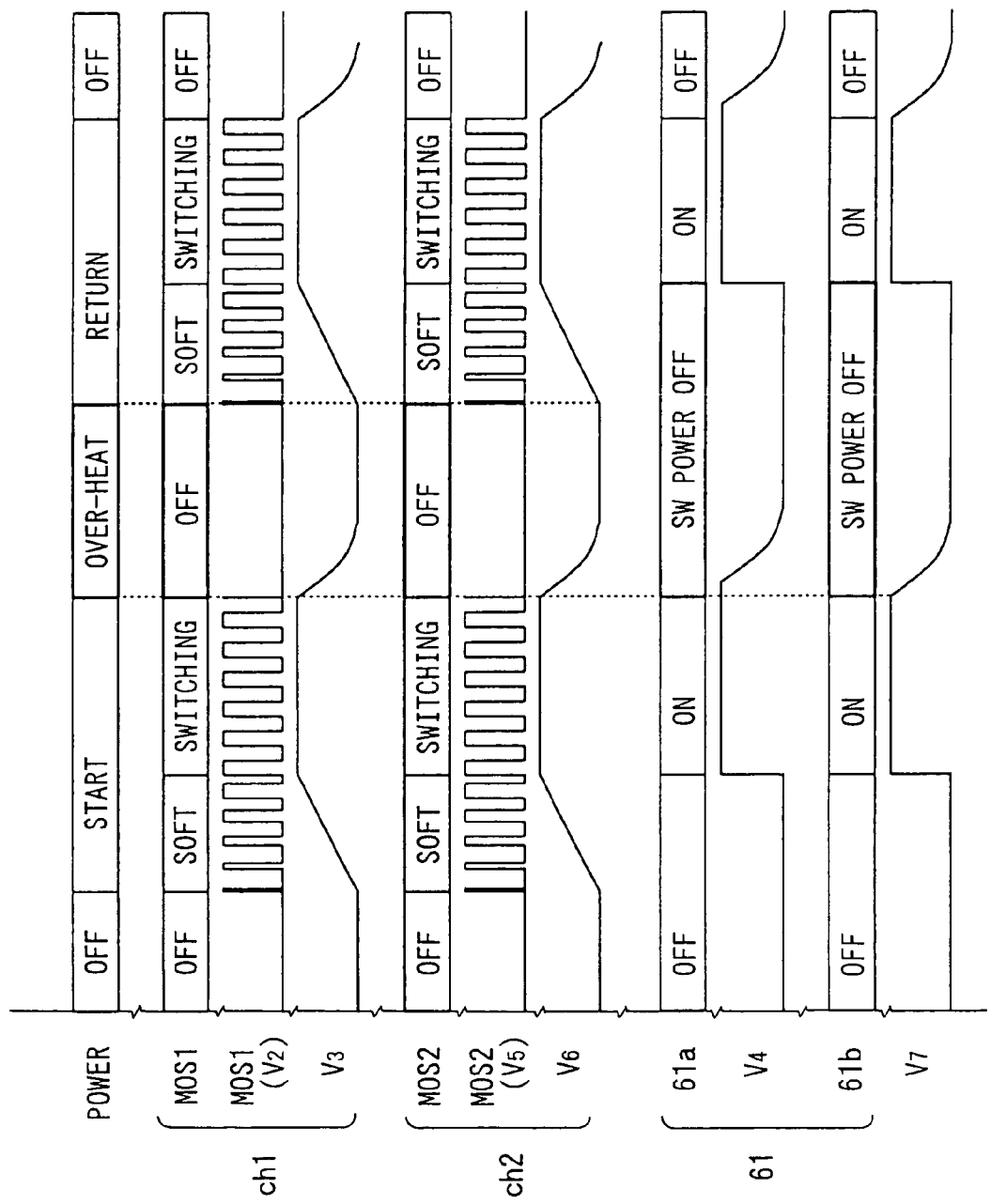
FIG. 4 is an operation diagram illustrating the operation of MOSs in the multi-output electric power source device according to the embodiment, voltages at various portions and the operation of a microcomputer.

FIG. 4 illustrates the operation of MOS1 and MOS2 in the multi-output electric power source device 1, voltages at various portions and the operation of the microcomputer 61. The multi-output electric power source device 1 starts operating (i.e., as the switching regulator of each channel starts operating), MOS1 and MOS2 commence the switching operation to produce constant voltages V4 and V7, which are, then, supplied to the microcomputer 61. Here, the soft start is effected so that the smoothed voltages V3 and V6 will not quickly increase (i.e., so that rush currents will not flow).

When, for example, the half-short state occurs and the MOS1 is over-heated due to an abnormal condition on the side to where the power supply of ch-1 is supplied, the over-heat detector circuit 33 detects this fact and turns both MOS1 and MOS2 off (i.e., turns both switching regulators off). Then, the constant voltage outputs V4 and V7 of ch-1 and ch-2 are not produced, and no electric power is supplied to the microcomputer 61. When it is detected by the comparator 37 that the temperature has dropped again, the switching regulators are returned back to the normal control operation again.

FIG. 6 schematically illustrates a vehicle-mounted electronic control device 60. In the vehicle-mounted electronic control device 60, a core 61a in the microcomputer 61 executes a variety of operations in response to sensor signals input to the microcomputer 61 from the external sensors through an input circuit 62, and produces control signals to drive circuits 63a, 63b for controlling the operation of the external electronic loads 64a, 64b. Based on the control signals from the microcomputer 61, the drive circuits 63a, 63b drive the external electronic loads 64a, 64b.

The electric power source for operation in the vehicle-mounted electronic control device 60 is supplied from the multi-output electric power source device 1 shown in FIG. 1. Specifically, the output V4 of ch-1 is supplied to the core 61a of the microcomputer 61, and the output V7 of ch-2 is supplied to an I/O port 61b, an external input circuit 62 and drive circuits 63a, 63b of the microcomputer 61.

In the multi-output electric power source device 1 of this embodiment as shown in FIG. 5A, the MOS1, MOS2 and over-heat detector circuit 33 are arranged in the same semiconductor integrated circuit (electric power source IC chip 50). If described in further detail, the electric power source circuit 2 in the IC surrounded by a two-dot chain line in FIG. 1 is all arranged in the IC electric power source chip 50.

According to the multi-output electric power source device 1, the single over-heat detector circuit 33 is used in common by MOS1 and MOS2, and the construction in the device is simplified. Besides, when any one MOS is over-heated, MOS1 and MOS2 are interrupted from being turned on/off. When MOS1 or MOS2 is over-heated, therefore, the protection is accomplished in the device as a whole and, besides, the device as a whole is realized at a decreased cost.

Further, when the over-current or the over-voltage is detected in any channel, the series regulator control circuits 13 and 23 of each of the channels reduce the base currents of the corresponding transistors T1 and T2 to discontinue the supply of the constant voltage outputs V4 and V7 to the external unit. Even in case the over-current or over-voltage occurs, therefore, the protection is realized in the device as a whole.

Besides, MOS1 and MOS2 are arranged close to each other, the over-heat detector diode 33a is sandwiched between MOS1 and MOS2, and is neighboring MOS1 and MOS2. Further, MOS1, MOS2 and over-heat detector diode 33a are constructed in the same semiconductor integrated circuit (electric power source IC chip 50). It is therefore allowed to correctly and quickly detect changes in the MOS1 and MOS2 due to the heat and, hence, to detect the over-heating highly precisely.

Further, the switching regulators of the channels employ the same reference voltage for comparison with the voltages obtained by dividing the output voltages V3 and V6 that are fed back. Therefore, there may be employed only one reference voltage generating circuit 31 and one triangular wave generating circuit 32. Even when the switching regulators of the channels have different target voltages as in this embodiment, therefore, there is no need of providing the circuits 31 and 32 for each of the switching regulators. Accordingly, the device can be more simplified and its cost can be further decreased.

In this embodiment, further, the reference voltage output from the reference voltage generating circuit 31 gradually increases up to Vref after the start of operation of the switching regulators of the channels, preventing the rush currents from flowing into the capacitors C2 and C3 in the output smoothing circuits 4 and 5. In this embodiment as described above, only one reference voltage generating circuit 31 is used and, hence, the circuit for realizing the soft start can be fabricated on the smallest circuit scale, and the soft start function used in common by the two switching regulators can be inexpensively realized.

In this embodiment, further, the electric power source circuit 2 in the IC represented by the two-dot chain line in FIG. 1 is constructed in the same semiconductor integrated circuit. Accordingly, the voltage-dividing resistors R11, R12, R21, R22, reference voltage generating circuit 31 and triangular wave generating circuit 32 are all constructed in the same integrated circuit. Therefore, even if the ambient temperature changes causing a change in the voltage-dividing resistances and in the resistances of the resistor elements (not shown) used for determining output voltage levels in the circuits 31, 32, relative accuracy of the resistor elements for a change in the temperature is maintained at a high level, and constant voltages are obtained maintaining good temperature characteristics.

In particular, the multi-output electric power source device 1 of this embodiment can be effectively employed as an electric power source device for the vehicle-mounted electronic control devices 60 that are liable to be subjected to vigorous changes in the ambient temperature, to highly precisely control the output voltages against changes in the temperature.

By using the multi-output electric power source device 1 of this embodiment as an electric power source for the vehicle-mounted electronic control device 60 (FIG. 6), different electric power source voltages can be applied to the core 61*a* and to the I/O port 61*b* of the microcomputer 61. Besides, protection is provided for the channels preventing such an occurrence that one electric power source has broken down but the other electric power source is continuously supplying the power. It is thus allowed to provide the vehicle-mounted electronic control device 60 that operates more stably.

In the embodiment, the switching regulator control circuits 12, 22 and the series regulator control circuits 13, 23 operate as a protection circuit. In the switching regulator control circuit 12, in particular, the pre-drive circuit 43 therein works as the protection circuit.

The embodiment of the invention is not limited to the above embodiment only but can be modified in a variety of forms so far as it pertains to the technical scope of the invention.

For example, MOS1 and MOS2 in the switching regulators are no longer turned on/off when the over-heat is detected by the over-heat detector circuit 33. In its place, however, the signals from the over-heat detector circuit 33 may be input to the series regulator control circuits 13, 23 as indicated by broken arrows A and B in FIG. 1, and the corresponding transistors T1 and T2 may be controlled (so will not to produce outputs) by the series regulator control circuits 13 and 23.

Then, the output is interrupted on the current-carrying path of the electric power source device at a place closest to the output side, and the supply of power to the external unit can be shut off more quickly to more effectively protect the device.

In the above embodiment, further, the series regulators of the two channels discontinue their operation in case an over-current or an over-voltage is detected in either channel. Not being limited thereto only, however, the switching regulators of the two channels may discontinue their operation as indicated, for example, by broken arrows A, D, E and F in FIG. 1. In this case, however, even when the switching regulators discontinue their operation, the output to the external unit may not readily be stopped due to the residual electric charge in, for example, the capacitor C2 of the output smoothing circuit 4. It is, therefore, desired that the operation of the series regulators is stopped as in the above embodiment.

Most desirably, further, in the embodiment in which the reference voltage generating circuit 31 and the triangular wave generating circuit 32 are used in common, the operation of the switching regulators of the channels may be stopped by interrupting the output of at least either the reference voltage generating circuit 31 or the triangular wave generating circuit 32. That is, as indicated by broken arrows G and H in FIG. 1, the reference output voltage from the reference voltage generating circuit 31 is set to be 0 V or the reference voltage output path is shut off to interrupt the output from the switching regulators. Alternatively, the reference output waveform signal is set to be 0 V or the output path of the reference waveform signal is shut off to interrupt the output from the switching regulators.

That is, the operation of the two switching regulators is stopped by acting a protection control signal (signal representing the detection of over-heat) from a protection function (here, over-heat detector circuit 33) upon the common control signal (reference waveform or triangular wave) that is fed to the switching regulators to form the voltages. Then, the multi-output electric power source device 1 having a harmonious protection function can be constructed using reduced wiring and circuitry at a decreased cost.

In this case, too, the protection control signals from the over-heat detector circuit 33 are not limited to those indicated by broken arrows g and h but, instead, the output of reference waveform/reference voltage can similarly be discontinued upon receiving signals from, for example, the comparators 15, 25 that detect the over-voltage.

Further, as the protection operation when the over-heat is detected in the above embodiment, MOS1 is turned off by discontinuing the formation of the control signal from the pre-drive circuit 43 (FIG. 2). Not being limited thereto only, however, the gate potential of the MOS1 may be forcibly lowered to the low level when, for example, the over-heat is detected to turn the MOS1 off irrespective of the presence of the control signal.

In the above embodiment, further, a triangular wave was used as a reference waveform for determining the duty. Not being limited thereto only, however, it is also allowable to use, for example, a saw-tooth wave. Namely, a variety of waveforms can be used so far as they can form a duty signal in comparison with an error signal from the error amplifier 41.

In the above embodiment, further, the diode (over-heat detector diode 33*a*) was used as an over-heat detector element. However, the over-heat detector element is in no way limited to the diode itself but may be a diode formed across the base and the emitter of, for example, a bipolar transistor. Alternatively, a resistor element may be formed on the semiconductor integrated circuit to use it as the over-heat detector element. In effect, any element may be used provided it produces an electric signal in response to a change in the temperature.

In the above embodiment, the switching regulator and the series regulator are connected in series to constitute an electric power source circuit of one channel. Not being limited thereto only, however, there can be employed a variety of constructions, such as constituting the one channel by one switching regulator only, connecting plurality of switching regulators in series, or connecting a plurality of regulators in series in a stage that succeeds the switching regulator. In the above embodiment, further, a plurality of series regulators may be connected in parallel in each channel to increase the number of kinds of output voltages. In any construction, the protection is achieved in harmony among the channels, and there is provided an electric power source device best suited for the vehicle-mounted electronic control devices.

Though the above embodiment has employed two channels, it need not be pointed out that the electric power source device can be constructed by increasing the number of channels to be three or more. In this case, the channels after the first and second channels of FIG. 1 may be constructed by a series connection of the switching regulator and the series regulator like in the channels 1 and 2, as a matter of course, or may be constructed in a variety of ways, such as, by using the switching regulator only, series regulator only, or a combination thereof in a plurality of numbers. As for the third and subsequent channels, the over-heat protection by the over-heat detector circuit 33 can be accomplished in harmony, or the output may be interrupted when the over-voltage or the over-current is detected, and the circuit may be used in common if any, according to the kind of the regulator constructed, as in the first and second channels.

In this embodiment, further, when the over-heat is detected by the over-heat detector circuit 33 or when the over-voltage or over-current is detected in the channels, the protection is provided by interrupting the outputs V3 and V6 from the switching regulator, or by interrupting the outputs V4 and V7 by squeezing the base currents of the transistors T1 and T2 of the series regulators, so that the outputs V4 and V7 will not be supplied to the external units. However, the outputs need not necessarily be interrupted completely but, instead, the voltages may be limited to low values at which the core 61a and the I/O port 61b cease to operate. Namely, the protection can be provided in harmony when the over-heat, over-current or over-voltage is detected even by lowering the voltages down to values in a range in which both the core 61a and the I/O port 61b cease to operate.

It is also possible to modify the embodiment to a power source device which raises an input voltages to higher output voltages.

What is claimed is:

1. A multi-output electric power source device comprising:
    first and second constant voltage generating circuits for changing an input voltage from an external electric power source to predetermined supply voltages to be supplied to a vehicle-mounted electronic control device, wherein the first constant voltage generating circuit comprises a first switching regulator and the second constant voltage generating circuit comprises a second switching regulator, and wherein the first and the second switching regulators regulate the input voltage;
    an abnormal condition detector circuit for detecting an occurrence of an abnormal condition of either one of the first and second constant voltage generating circuits; and
    protection means provided for each of the constant voltage generating circuits to interrupt or limit an output of a supply voltage from the constant voltage generating circuit in which the abnormal condition was detected and the other of the first and second constant voltage generating circuits when the abnormal condition is detected,
    wherein the abnormal condition detector circuit is provided in common for the first and second constant voltage generating circuits to interrupt or limit the output of the supply voltage in both of the constant voltage generating circuits when the abnormal condition is detected by the abnormal condition detector circuit while maintaining the input voltage.

2. A multi-output electric power source device according to claim 1, wherein the protection means interrupts or limits the output from the first and second switching regulators to interrupt or limit the output of the supply voltage, when the abnormal condition is detected by the abnormal condition detector circuit.

3. A multi-output electric power source device according to claim 1, wherein:
    at least one of the constant voltage generating circuits includes a re-regulating circuit for further changing the output from the respective switching regulator; and
    the protection means including the re-regulating circuit, interrupts or limits the output from the re-regulating circuit when the abnormal condition is detected by the abnormal condition detecting circuit.

4. A multi-output electric power source device according to claim 3, wherein the constant voltage generating circuit having the re-regulating circuit includes:
    over-current detector which detects an electric current flowing through a current-carrying path of from an input side of the re-regulating circuit to a supply voltage output side, and determines the current to be an over-current when it exceeds a preset threshold current value; and
    an over-voltage detector which detects a voltage input to the re-regulating circuit and determines the input voltage to be an over-voltage when it exceeds a preset threshold voltage value; and wherein
    the protection means in all of the constant voltage generating circuits interrupts or limits the output from the first and second switching regulators to interrupt or limit the output of the supply voltage, when the over-voltage or the over-current is detected.

5. A multi-output electric power source device according to claim 4, wherein the protection means having the re-regulating circuit interrupts or limits the output from the re-regulating circuit, when the over-voltage or the over-current is detected.

6. A multi-output electric power source device according to claim 2, wherein:
    each of the first and second switching regulators includes a transistor provided on a current-carrying path from the input voltage side to the supply voltage output side, and switching control means for turning the transistor on and off so that the output voltage of the switching regulator assumes a preset target voltage; and
    the protection means interrupts or limits the output from the switching regulator by interrupting the control signal output to the transistor from the switching control means for on/off control in the switching regulator to interrupt or limit the output of the supply voltage.

7. A multi-output electric power source device according to claim 2, wherein:
    each of the first and second switching regulators includes a transistor provided on a current-carrying path from the input voltage side to the supply voltage output side, and switching control means for turning the transistor on and off so that the output voltage of the switching regulator assumes a preset target voltage; and
    the protection means interrupts or limits the output from the switching regulator by halting the operation of the switching control means in the switching regulator to interrupt or limit the output of the supply voltage.

8. A multi-output electric power source device according to claim 6, wherein the transistor of each switching regulator is arranged close to each other, and the abnormal condition detector circuit has at least one temperature detector means arranged close to each transistor to detect the over-heat of the transistor.

9. A multi-output electric power source device according to claim 8, wherein each transistor and the temperature detector means are formed in a same semiconductor integrated circuit.

10. A multi-output electric power source device comprising:
- a plurality of constant voltage generating circuits having respective switching regulators for changing an input voltage from an external electric power source to predetermined supply voltages to be supplied to a vehicle-mounted electronic control device, wherein at least two constant voltage generating circuits are constructed as common constant reference voltage generating circuits;
- the switching regulators of the common constant reference voltage generating circuits including transistors formed on a current-carrying path from an input voltage side to a supply voltage output side, and switching control means for turning the transistor on/off so that the output voltage of the switching regulator becomes a preset target voltage;
- the switching control means including attenuation means for attenuating its own output voltage that is fed back to a voltage of a predetermined level, error output means for comparing an attenuated voltage attenuated by the attenuation means with a predetermined reference voltage to produce an error signal corresponding to a difference between the two, and duty signal generating means for comparing the error signal from the error output means with a predetermined reference waveform to form a duty signal for turning the transistor on/off based upon the compared result;
- the attenuation means having such output voltage attenuation ratios that attenuated voltages of when the target voltages of the corresponding switching regulators are fed back assume the same value among the switching regulators possessed by all common constant reference voltage generating circuits;
- a reference voltage generating means that provides the reference voltage and is used in common by all of the common constant reference voltage generating circuits; and
- a reference waveform generating means that provides a reference waveform and is used in common by all of the common constant reference voltage generating circuits.

11. A multi-output electric power source device according to claim 10, wherein the target voltages are different among the common constant reference voltage generating circuits.

12. A multi-output electric power source device according to claim 10, wherein the reference voltage generating means so changes the reference voltage that the output voltage of the switching regulators gradually increases up to the target voltage at the start of operation of the switching regulators in the common constant reference voltage generating circuits.

13. A multi-output electric power source device according to claim 10, wherein the attenuation means, the reference voltage generating means and the reference waveform generating means are constructed in a same semiconductor integrated circuit.

14. A multi-output electric power source device according to claim 10, further comprising:
- an abnormal condition detector circuit which is so constructed as to detect an occurrence of an abnormal condition in any one of the common constant reference voltage generating circuits; and
- at least either one of reference voltage-limiting means for interrupting or limiting the output of the reference voltage from the reference voltage generating means or reference waveform-limiting means for interrupting or limiting the output of the reference waveform from the reference waveform generating means,
- wherein, when an abnormal condition is detected by the abnormal condition detecting circuit, the reference voltage-limiting means or the reference waveform-limiting means provided in the multi-output electric power source device executes the operation.

15. A vehicle-mounted electronic control device having at least two circuits that receive different electric power source voltages from an external unit, and operate upon exchanging signals relative to each other, wherein a multi-output electric power source device is used as the electric power source device for supplying different electric power source voltages to the at least two circuits, the electric power source voltages being supplied to the at least two circuits from the constant voltage generating circuits to be protected, the multi-output electric power source device comprising:
- a plurality of constant voltage generating circuits for changing an input voltage from an external electric power source to predetermined supply voltages to be supplied to a vehicle-mounted electronic control device, at least two of the constant voltage generating circuits having switching regulators for changing the input voltage;
- an abnormal condition detector circuit for detecting an occurrence of an abnormal condition in the constant voltage generating circuits in either one of the constant voltage generating circuits; and
- protection means provided for each of the constant voltage generating circuits to interrupt or limit an output of a supply voltage from the corresponding constant voltage generating circuits when the abnormal condition is detected,
- wherein the abnormal condition detector circuit is provided in common for the at least two constant voltage generating circuits to interrupt or limit the output of the supply voltage in all of the constant voltage generating circuits when the abnormal condition is detected by the abnormal condition detector circuit.

16. A vehicle-mounted electronic control device having a plurality of circuits that operate upon receiving power supply from an external unit, wherein the multi-output electric power source device of claim 10 used as the electric power source device for supplying different electric power source voltages to at least two circuits among the plurality of circuits, the electric power source voltages being supplied to the at least two circuits from the common constant reference voltage generating circuits.

17. A vehicle-mounted electronic control device according to claim 16, wherein the at least two circuits include a microcomputer and an external circuit that exchanges signals relative to the microcomputer.

18. A multi-output electric power source device according to claim 1, wherein:
- at least one of the constant voltage generating circuits includes a re-regulating circuit for further changing the output from the respective switching regulator; and
- the protection means including the re-regulating circuit, interrupts or limits the output from the re-regulating circuit when the abnormal condition is detected by the abnormal condition detecting circuit when an overvoltage or an over-current is detected.

19. A multi-output electric power source device according to claim 18, wherein the constant voltage generating circuit having the re-regulating circuit includes:
- over-current detector which detects an electric current flowing through a current-carrying path of from an input side of the re-regulating circuit to a supply voltage output side, and determines the current to be the over-current when it exceeds a preset threshold current value; and an over-voltage detector which detects a voltage input to the re-regulating circuit and determines the input voltage to be the over-voltage when it exceeds a preset threshold voltage value; and wherein the protection means in all of the constant voltage generating circuits interrupts or limits the output from the first and second switching regulators to interrupt or limit the output of the supply voltage, when the over-voltage or the over-current is detected.

20. A multi-output electric power source device comprising:

a plurality of constant voltage generating circuits for changing an input voltage from an external electric power source to predetermined supply voltages to be supplied to a vehicle-mounted electronic control device, at least two of the constant voltage generating circuits having switching regulators for changing the input voltage;

an abnormal condition detector circuit for detecting an occurrence of an abnormal condition in the constant voltage generating circuits in either one of the constant voltage generating circuits; and protection means provided for each of the constant voltage generating circuits to interrupt or limit an output of a supply voltage from the corresponding constant voltage generating circuits when the abnormal condition is detected, wherein the abnormal condition detector circuit is provided in common for the at least two constant voltage generating circuits to interrupt or limit the output of the supply voltage in all of the constant voltage generating circuits when the abnormal condition is detected by the abnormal condition detector circuit, wherein at least one of the constant voltage generating circuits includes a re-regulating circuit for further changing the output from the switching regulator and the protection means including the re-regulating circuit, interrupts or limits the output from the re-regulating circuit when the abnormal condition is detected by the abnormal condition detecting circuit when an over-voltage or an over-current is detected.

21. A multi-output electric power source device according to claim 20, wherein the constant voltage generating circuit having the re-regulating circuit includes:

over-current detector which detects an electric current flowing through a current-carrying path of from an input side of the re-regulating circuit to a supply voltage output side, and determines the current to be the over-current when it exceeds a preset threshold current value; and an over-voltage detector which detects a voltage input to the re-regulating circuit and determines the input voltage to be the over-voltage when it exceeds a preset threshold voltage value; and wherein the protection means in all of the constant voltage generating circuits interrupts or limits the output from the first and second switching regulators to interrupt or limit the output of the supply voltage, when the over-voltage or the over-current is detected.

22. A multi-output electric power source device comprising:

a plurality of constant voltage generating circuits for changing an input voltage from an external electric power source to predetermined supply voltages to be supplied to a vehicle-mounted electronic control device, at least two of the constant voltage generating circuits having switching regulators for changing the input voltage;

an abnormal condition detector circuit for detecting an occurrence of an abnormal condition in the constant voltage generating circuits in either one of the constant voltage generating circuits; and protection means provided for each of the constant voltage generating circuits to interrupt or limit an output of a supply voltage from the corresponding constant voltage generating circuits when the abnormal condition is detected, wherein the abnormal condition detector circuit is provided in common for the at least two constant voltage generating circuits to interrupt or limit the output of the supply voltage in all of the constant voltage generating circuits when the abnormal condition is detected by the abnormal condition detector circuit, wherein the protection means interrupts or limits the output from the switching regulator to interrupt or limit the output of the supply voltage, when the abnormal condition is detected by the abnormal condition detector circuit, wherein the switching regulator includes a transistor provided on a current-carrying path from the input voltage side to the supply voltage output side, and switching control means for turning the transistor on and off so that the output voltage of the switching regulator assumes a preset target voltage and wherein the protection means interrupts or limits the output from the switching regulator by interrupting the control signal output to the transistor from the switching control means for on/off control in the switching regulator to interrupt or limit the output of the supply voltage, wherein each transistor and the temperature detector means are formed in a same semiconductor integrated circuit.

* * * * *